US010767672B2

(12) United States Patent
Le Coq et al.

(10) Patent No.: US 10,767,672 B2
(45) Date of Patent: Sep. 8, 2020

(54) METHOD FOR CONTROLLING A LIFTING JACK FOR AN AIRCRAFT ENGINE NACELLE, A JACK-TYPE LIFTING SYSTEM IMPLEMENTING THE METHOD AND THE THUS EQUIPPED NACELLE

(71) Applicant: AIRCELLE, Gonfreville l'Orcher (FR)

(72) Inventors: Vincent Le Coq, St Romain de Colbosc (FR); Marc Gerome, Le Havre (FR)

(73) Assignee: Safran Nacelles, Gonfreville l'Orcher (FR)

(*) Notice: Subject to any disclaimer, the term of this patent is extended or adjusted under 35 U.S.C. 154(b) by 945 days.

(21) Appl. No.: 14/979,716

(22) Filed: Dec. 28, 2015

(65) Prior Publication Data

US 2016/0138623 A1 May 19, 2016

Related U.S. Application Data

(63) Continuation of application No. PCT/FR2014/051651, filed on Jun. 27, 2014.

(30) Foreign Application Priority Data

Jun. 28, 2013 (FR) ..................................... 13 56275

(51) Int. Cl.
*F15B 15/24* (2006.01)
*B64D 29/06* (2006.01)
(Continued)

(52) U.S. Cl.
CPC .............. *F15B 15/24* (2013.01); *B64D 29/06* (2013.01); *B64D 29/08* (2013.01); *F02K 1/82* (2013.01);
(Continued)

(58) Field of Classification Search
CPC . F02K 1/76; F02K 1/763; F02K 1/766; F02K 1/82; B64D 29/06; B64D 29/08;
(Continued)

(56) References Cited

U.S. PATENT DOCUMENTS 3,002,497 A * 10/1961 Gulick ...................... F02K 1/76 91/402
3,164,956 A * 1/1965 Colebrook ................ F02K 1/56 239/265.37
(Continued)

FOREIGN PATENT DOCUMENTS

DE 35 42 041 C1 7/1987
DE 201 20 204 U1 4/2003
(Continued)

OTHER PUBLICATIONS

International Search Report dated Oct. 9, 2014 in International Application No. PCT/FR2014/051651.

*Primary Examiner* — Jason H Duger
(74) *Attorney, Agent, or Firm* — Burris Law, PLLC

(57) ABSTRACT

The jack-type lifting system includes a valve for modifying a maximum force value of a lifting jack activated by a protrusion for determining a determined portion such as the beginning of the extension stroke of the lifting jack. Thanks to the modification of the maximum force value, a pressure source thus applies the full force of the lifting jack after a start-up stroke so as to protect a lock of a reverser cowl which has been forgotten during maintenance.

10 Claims, 4 Drawing Sheets

3
6
11
29
28
39
38
37
23
21
22
20

(51) Int. Cl.

| | |
|---|---|
| ***B64D 29/08*** | (2006.01) |
| ***F02K 1/82*** | (2006.01) |
| ***F15B 15/20*** | (2006.01) |
| ***F15B 15/14*** | (2006.01) |
| *F15B 11/028* | (2006.01) |
| *F15B 15/04* | (2006.01) |
| *F15B 15/16* | (2006.01) |

(52) U.S. Cl.
CPC ........ *F15B 15/1414* (2013.01); *F15B 15/202* (2013.01); *F15B 15/204* (2013.01); *F15B 11/028* (2013.01); *F15B 15/04* (2013.01); *F15B 15/16* (2013.01); *F15B 2211/50518* (2013.01); *F15B 2211/524* (2013.01); *F15B 2211/528* (2013.01); *F15B 2211/55* (2013.01); *F15B 2211/76* (2013.01); *F15B 2211/851* (2013.01); *F15B 2211/8603* (2013.01)

(58) Field of Classification Search
CPC .... F15B 11/028; F15B 15/24; F15B 15/1414; F15B 15/202; F15B 15/204; F15B 15/04; F15B 15/16; F15B 2211/50518; F15B 2211/524; F15B 2211/528; F15B 2211/55; F15B 2211/76; F15B 2211/851; F15B 2211/8603
See application file for complete search history.

(56) References Cited

U.S. PATENT DOCUMENTS

| | | | | |
|---|---|---|---|---|
| 4,391,409 | A * | 7/1983 | Scholz .................... | F02K 1/763 239/265.29 |
| 6,526,744 | B2 * | 3/2003 | Ahrendt .................... | F02K 1/72 239/265.29 |
| 8,573,928 | B2 * | 11/2013 | Soulier .................. | B64D 29/06 415/126 |
| 8,689,823 | B2 * | 4/2014 | Stanford ............... | F15B 11/072 137/505.13 |
| 2011/0072780 | A1 * | 3/2011 | Somerfield ............ | F02K 1/763 60/226.2 |

FOREIGN PATENT DOCUMENTS

| | | |
|---|---|---|
| GB | 1 245 732 A | 9/1971 |
| GB | 2 095 333 A | 9/1982 |

* cited by examiner

METHOD FOR CONTROLLING A LIFTING JACK FOR AN AIRCRAFT ENGINE NACELLE, A JACK-TYPE LIFTING SYSTEM IMPLEMENTING THE METHOD AND THE THUS EQUIPPED NACELLE

CROSS-REFERENCE TO RELATED APPLICATIONS

This application is a continuation of International Application No. PCT/FR2014/051651, filed on Jun. 27, 2014, which claims the benefit of FR 13/56275, filed on Jun. 28, 2013. The disclosures of the above applications are incorporated herein by reference.

FIELD

The present disclosure relates to a method for controlling a lifting jack for a thrust reverser cowl of an aircraft engine nacelle.

BACKGROUND

The statements in this section merely provide background information related to the present disclosure and may not constitute prior art.

A thrust reverser of an aircraft engine nacelle is constructed with two annular panels, hinged by an aligned generatrix. The two panels have to be open during maintenance operations which may in particular be carried out in the open air. The large size of the cowls, their mass and their wind resistance involve handling forces which impose a mechanized opening, in particular by means of fluid jacks, most often hydraulic jacks.

Moreover, it is known that the cowls of the thrust reverser are fitted with locks so that, in operation, the nacelle remains closed. Hence, there exists a maintenance procedure which first imposes the deactivation of the closing locks of the thrust reverser cowls. Then a system for lifting the cowls by means of fluid jacks is controlled by the maintenance operator, so that the unlocked cowls rise to allow the access to the inside of the nacelle and/or of the turbojet engine itself.

However, a problem arises in case the operator omits to unlock the cowls. Because of the resistant forces, the jacks of the cowls lifting system are high-powered. As a result, if the locks have not been released, considerable forces are applied, resulting in damages of the cell.

In order to avoid these destructions, the mechanical portions that are subjected to the forces of the lifting system when the locks have inadvertently been left closed by the maintenance operator is oversized. However, such an oversizing induces in particular an increase of the mass of the nacelle, which is generally to be avoided in the aeronautical field.

Moreover, double-rod jacks can be used when the stroke of the jack is particularly long, which is the case for the opening of the cowls of the thrust reverser in a turbojet engine nacelle. Indeed, the external rod is provided by construction with a piston having a wider surface than the piston of the internal rod, since the latter has to slide inside the external rod at a second phase during the extension of the jack. As a result, the force exerted by the jack is higher by construction, at start-up of the jack at the beginning of its extension, than in the second portion of its extension, and this in the ratio of the surfaces of the pistons.

SUMMARY

The present disclosure provides a method for controlling a lifting jack for a cowl such as a thrust reverser cowl of an aircraft engine nacelle, which includes modifying the maximum force value of the jack through a determined portion of the extension stroke of the jack.

The present disclosure also provides a jack-type lifting system implementing the method of the present disclosure. According to the present disclosure, it includes a means for modifying the power of the jack, which is activated by a means for detecting a determined portion of the extension stroke of the jack.

According to other aspects of the present disclosure:

At least one jack is a fluid jack, and the system of the present disclosure includes a system for controlling the pressure supplied to at least one jack, characterized in that the means for modifying the maximum force value of the fluid jack includes at least one valve connected on at least one pressure source applied to a compression chamber of the jack, the valve presenting at least two calibrations, so that, through a portion of the extension stroke, a first calibration is applied to the pressure of the fluid of the jack and through another portion of the extension stroke, a second calibration is applied to the pressure of the fluid of the jack;

the means for detecting a determined portion of the extension stroke of the jack includes a needle movable under the action of the piston of the jack, an end of the needle presenting a profile such that, through the stroke of the piston, the profile progressively repels a calibration adjusting ball in contact with a calibration spring of said valve between at least two adjustment positions of the calibration;

the calibration ball is in contact, via a rod, with a spring having a determined stiffness and connected through a first portion of the stroke of the jack with another calibration spring having a determined stiffness for applying a second calibration to the valve through the second portion of the stroke of the jack;

the means for modifying the maximum force value of the fluid jack includes a distributor including a pressure chamber applied on the body of the jack in connection with the chamber of the jack, and at least two air vent valves presenting different calibrations, the first and second valves being connected to determined points of said pressure chamber of the distributor and of said pressure chamber of the jack, a fluid pressure access being connected to each of said two chambers so that, through a first portion of the extension stroke of the jack, the first valve applies a first reduced value of the jack maximum force, then so that the second valve applies a second nominal value of the jack maximum force;

the means for detecting the determined portion of the extension stroke of the jack includes a rod connected to a piston which slides inside said chamber, another end of the rod passing through the body of the jack to penetrate into the chamber of the mobilization piston of the movable rod;

the means for detecting the determined portion of the extension stroke of the jack includes a protrusion disposed on the movable rod of the jack, the protrusion presenting a profile such that, through at least one portion of the stroke of the movable rod, the profile activates the means for modifying the maximum force value of the jack;

The jack progressively changes in angle during its extension, and the means for detecting the determined portion of the extension stroke of the jack includes a fixed portion in relation to the body of the jack and in that the means for modifying the maximum force value of the jack includes a valve for venting the pressurized fluid supply of the jack and whose calibration spring may remain in contact with said fixed portion in relation to the body of the jack through a determined portion of the angular stroke of the jack.

Finally, the present disclosure concerns a nacelle of an aircraft engine equipped with a fluid jack-type lifting system according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5A:
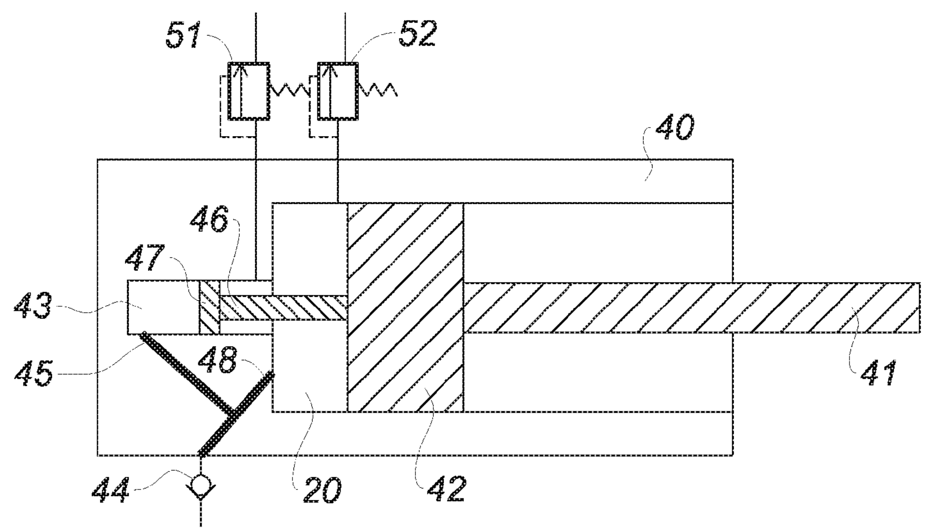
Figure 5B:
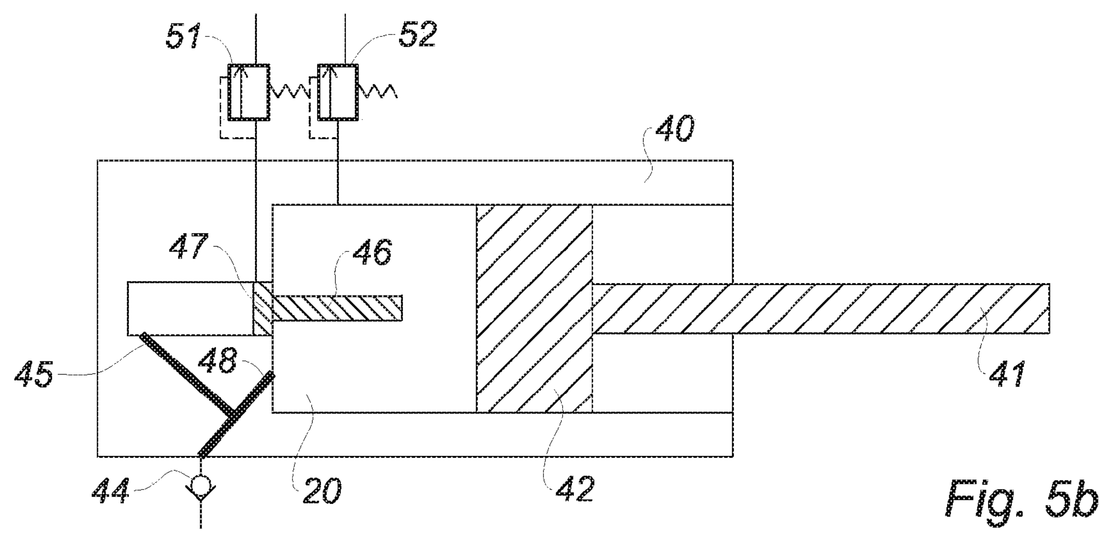
Figure 6A:
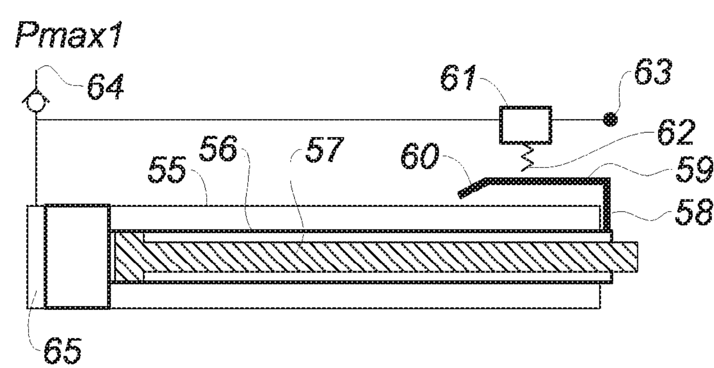
Figure 6B:
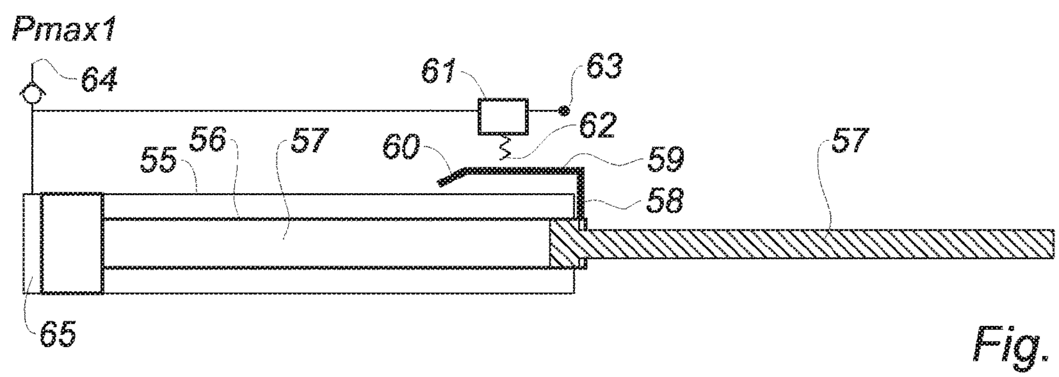
Figure 6C:
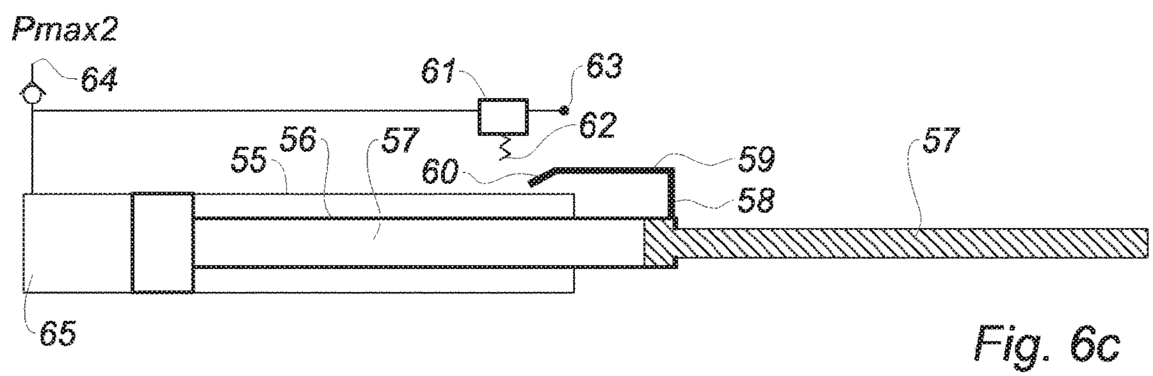
Figure 7A:
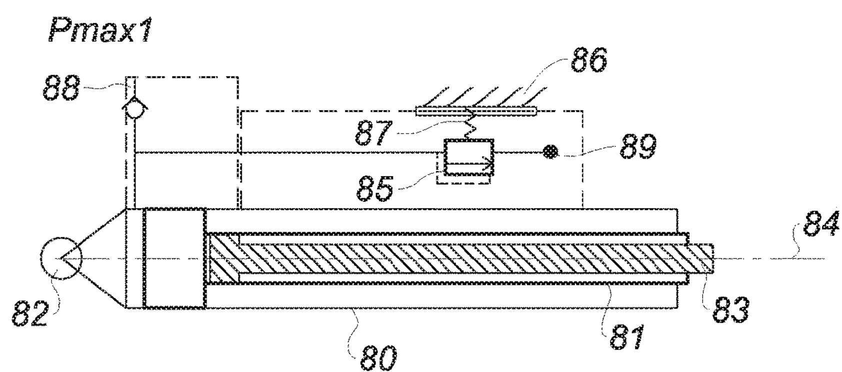
Figure 7B:
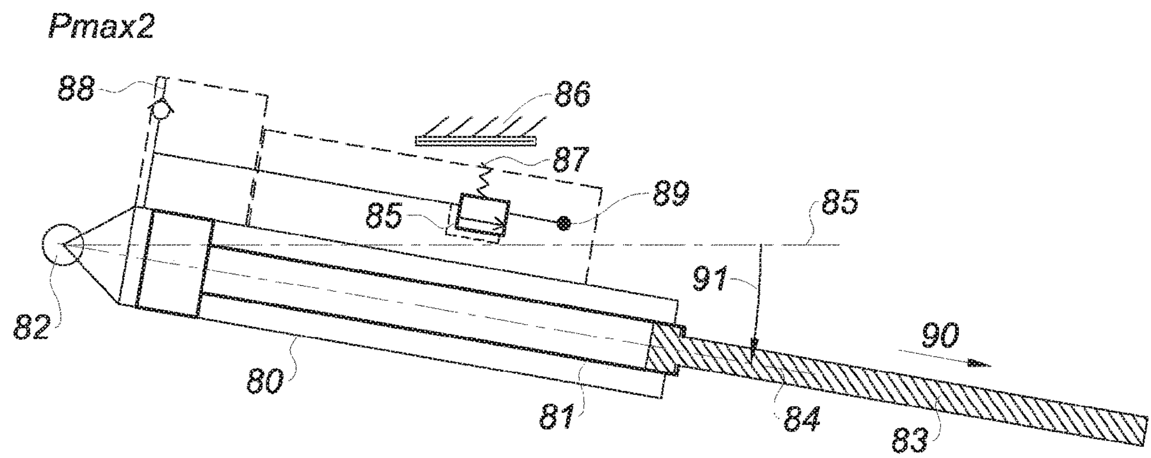

FIGS. 5*a* and 5*b* are sectional schematic representations of two consecutive states of a second form of a jack-type lifting system according to the present disclosure;

FIGS. 6*a* to 6*c* are sectional schematic representations of three successive states of a third form of a jack-type lifting system according to the present disclosure; and FIGS. 7*a* and 7*b* are two sectional schematic representations of two successive states of a fourth form of a jack-type lifting system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
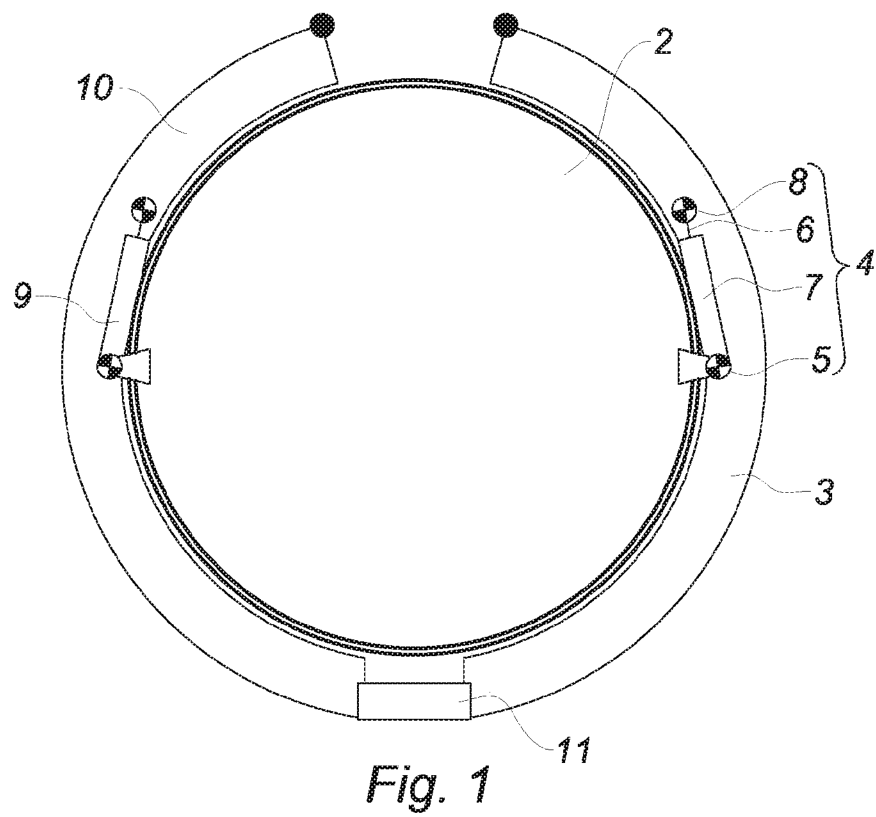
FIG. 1 is a schematic cross-sectional view of a turbojet engine nacelle, the cowls of the thrust reverser being closed and locked.

In FIG. 1, there is represented a schematic cross-sectional view of a turbojet engine nacelle, the cowls of the thrust reverser being closed and locked. The turbojet engine itself presents a substantially cylindrical central body surrounded by a generally annular-shaped nacelle, having substantially the same axis as the turbojet engine, and which includes numerous features such as, in particular, the thrust reverser. In a particular type of nacelles, the right-side 10 and left-side 3 cowls of the thrust reverser are constituted by half-cylindrical shaped panels, hinged at their upper edge on hinges in FIGS. 1 and 2. Their opposite edges on the lower generatrix in the drawing are blocked in the closed position by a lock 11. Between the core composed by the turbojet engine 2 itself and the left-side cowl 3 lies the fluid jack 4, such as a hydraulic jack mainly composed of a fixed clevis 5 secured to the turbojet engine 2, an extendable jack rod 6 sliding inside a jack body 7 which carries at its other end a movable clevis 8 secured to a point of the inner face of the left-side cowl 3.

Similarly, the right-side cowl 10 is mobilized by its own jack 9 which is identical to the described jack 4. Thus, the lifting system includes two jacks with their own control system which supplies them with pressured fluid based on the command applied by a maintenance operator.

When the lock 11 is unlocked, the user actuates the lifting system of the cowls so that the rod 6 of the jack 4 extends, thereby constraining the left-side cowl 3 to rotate about its fixed upper axis. The same motion is imposed to the right-side cowl 10, which has not been represented for simplicity. The motions of the right-side and left-side cowls are independent, each cowl being associated with its own jack of the lifting system.

Figure 2:
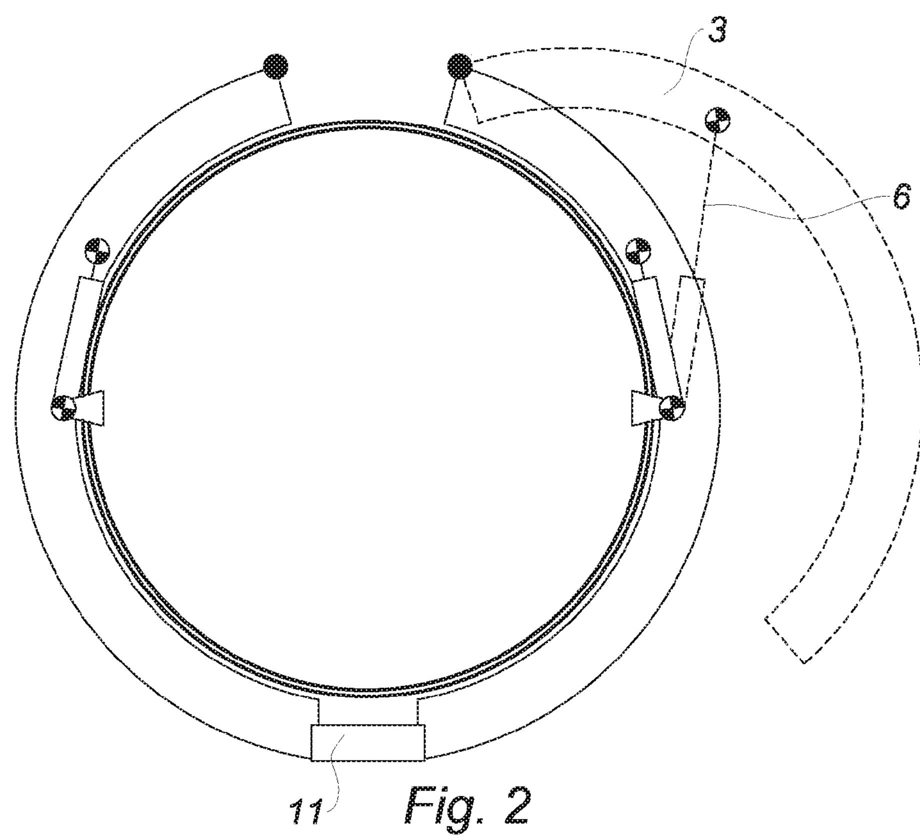
FIG. 2 is another schematic cross-sectional view of a turbojet engine nacelle, the cowls of the thrust reverser being unlocked and starting to be opened.

In FIG. 2, there is represented the nacelle of FIG. 1 where the left-side cowl 3 is in the open state. The rod 6 of the jack 4 is fully extended and the left-side cowl 3 has tilted about the hinge of the cowls. The problem underlying the present disclosure relates to the risk that the force of the jack is applied while the lock 11 has been mistakenly kept in the locked state.

The method of the present disclosure consists of reducing the value of the maximum force of the jack at the beginning of the extension stroke of its rod. Beyond this start-up threshold stroke, the control system of the jack switches from a low maximum force value into a nominal maximum force value of the jack. The start-up threshold stroke corresponds to the point at which the cowl escapes from the retaining mechanism of the lock. This results in that, if the lock 11 (FIGS. 1 and 2) has inadvertently been left locked, the extension of the jack cannot exceed the start-up threshold stroke. Indeed, the force applied by the jack operating under the reduced value is not high enough for damaging both the nacelle and the lock. As a result, the stroke of the jack is stopped. Therefore, it is clear to the operator that he has forgotten to release the lock. Therefore, he can stop the activation of the jack and finally proceed to the unlocking the forgotten lock without the mechanisms having undergone any destructive force.

Conversely, if the lock has not been forgotten, when the rod of the jack has exceeded the determined threshold stroke, it would have covered this stroke under a reduced force which is high enough to overcome the normal resistances of the mobilized mechanism without locking. When the start-up threshold stroke is exceeded, the control system of the jack then applies the full value of the maximum force applied by the jack which then drives the cowl along the entire expected stroke.

More generally, the method of the present disclosure includes a first step of detecting a determined portion of the extension stroke of the jack, upon completion of which a second step of changing the maximum force value is applied on the control system of the jack.

As a result, the jack-type lifting system of the present disclosure includes a means for modifying the maximum force value of the jack, activated by a means for detecting a determined portion of the extension stroke. In the application to the protection of the lock of a cowl for a turbojet engine nacelle, the determined portion of the extension stroke corresponds to the start-up threshold stroke beyond which the cowl escapes from the lock if the lock is properly unlocked. In this application, the modification of the maximum force value of the jack consists of switching from a reduced value of the maximum force of the jack into a nominal value of the maximum force of the jack. The reduced value is determined so as to be lower than the force to which the lock remained locked can withstand and higher than the force from which the jack can begin its extension stroke.

Figure 3:
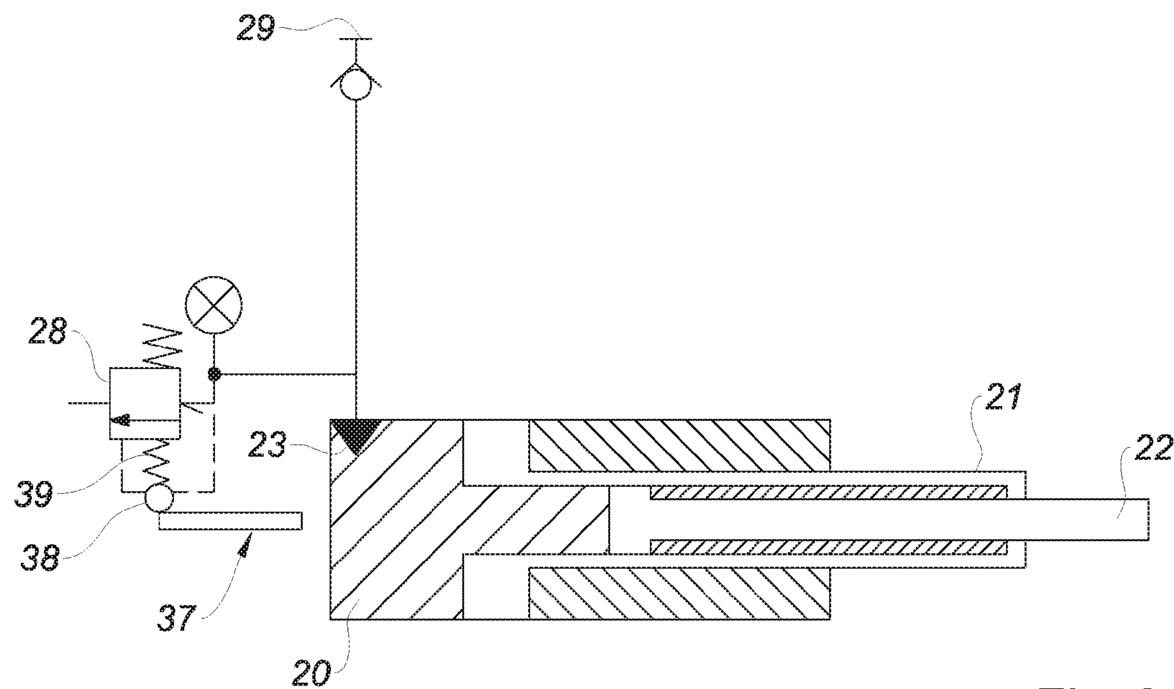
FIG. 3 is a schematic representation of a lifting system with a double-rod fluid jack incorporating a first form of the present disclosure.

In FIG. 3, there is represented a lifting system with a double-rod fluid jack incorporating a first form of the present disclosure.

The fluid jack includes an internal rod 22 which slides inside an external rod 21. Each rod being fitted with a piston at its left-side end of the drawing. The body of the jack presents a chamber 20 in which the control system (not represented) of the jack applies various pressures thereby allowing to apply extensions to the two rods and to make them retract.

The access 24 is located on the body of the jack so that, even if the piston of the external rod 21 is fully retracted inside the body, the mobilization pressure of the jack can be used when the operator actuates a start-up valve.

In one form of the present disclosure, the means for modifying the maximum force value of the jack includes an air vent valve 28 which is connected to the high-pressure source 29. The air vent valve 28 includes a spring 39 for calibrating the opening pressure as commonly known.

However, for the implementation of the present disclosure, the calibration spring 39 cooperates, through one end, with a ball 38, secured to a cylindrical housing, with the same axis as the axis of the spring 39, the housing being applied in the base of the valve 28 under the calibration spring 39.

The means for detecting a determined portion of the extension stroke of the jack includes a needle 37 which has been schematically represented in FIG. 3. The needle 37 is disposed through the body of the jack so as to come into contact through a first end, with the bottom of the piston of the external rod 21 when the rod is fully retracted inside the body of the jack, and therefore when the chamber 20 of the body of the jack presents its smallest volume. In this configuration, the needle 37 is displaced to the left of the drawing so that the ball 38 is pressed and repelled toward the spring 39 thereby compressing it. In this configuration, the valve 28 presents a first pressure calibration so that the pressure prevailing in the chamber 20 is lower than the pressure corresponding to the full force value of the jack. The action of the spring 39 then modifies the initial calibration in order to obtain a new value at the beginning of the opening operation.

If the stroke of the jack is not hindered by a lock whose opening have been omitted, the internal rod 22 of the jack starts its extension. The tip of the needle 37 in contact with the ball 38 presents a rounded profile. Because of the profile of the tip of the needle 37 in contact with the ball 38 and under the action of the spring 30, the needle 37 is repelled to the right of the drawing toward the piston. The needle 37 follows the stroke of the piston associated with the internal rod 22 while the spring 39 expands, thereby making the valve 28 switch progressively into a second pressure calibration when a start-up threshold stroke is reached, determined by the profile of the tip of the needle 37 in contact with the ball 38. In this second pressure calibration, the pressure prevailing in the chamber 20 is then equal to the pressure corresponding to the full force value of the jack. Once the start-up threshold stroke is exceeded, the jack enters into its full-power operating mode.

Conversely, for example in the event where the lock 11 (see FIG. 1) has been kept closed while the extension command of the jack has been executed, the resistance of the lock prevents the extension of the jack. However, because of the reduced value of the force applied by the jack, the lock resists the force and, as the maintenance operator notes the failure of the opening operation, he interrupts the command of the lock, unlocks the lock and resumes the activation of the jack without any damage.

Figure 4:
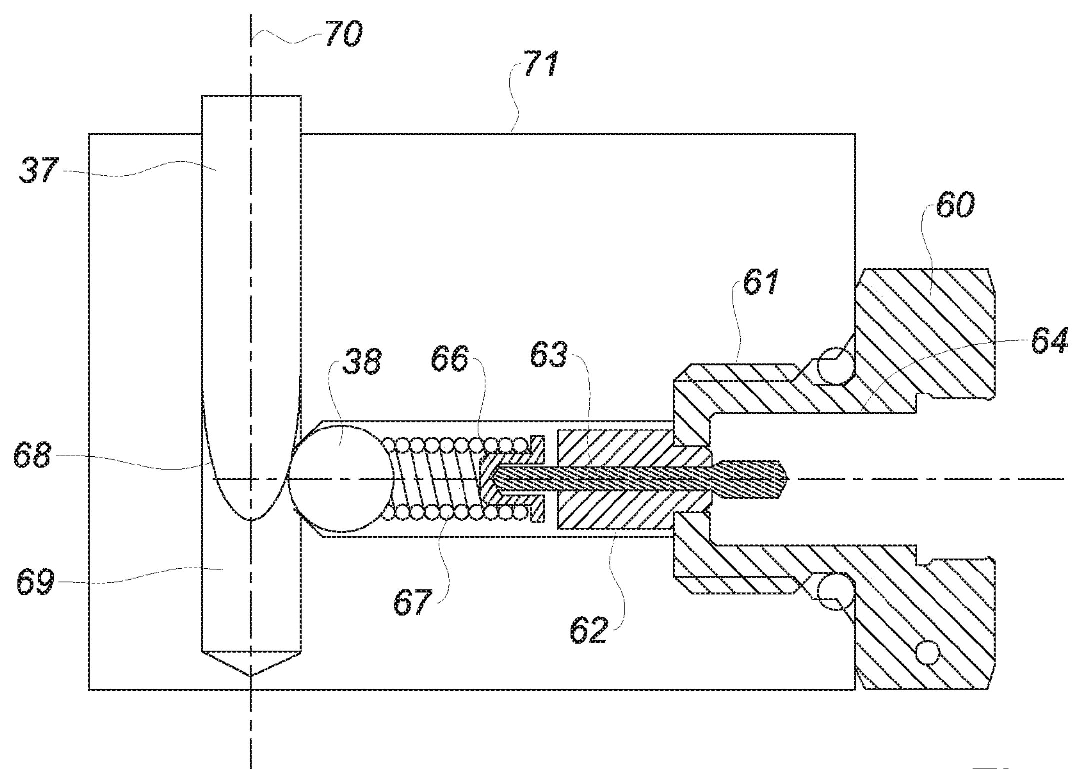
FIG. 4 is a sectional schematic representation of an example of a portion represented in FIG. 3.

In FIG. 4, there is represented an example of implementation of the first form represented in FIG. 3 on a particular valve such as the valve 28 of FIG. 3.

The valve 28 portion represented in FIG. 4 includes a calibration spring 67 which is mounted in a cap 60 the body of which presents a threaded portion 61 which is mounted in a base 71 of the body of the jack, to the left of the drawing in FIG. 3, the compression chamber 20 of the body of the jack being located above the block 71 of FIG. 4.

A rod 63 passes through a cylinder 62, secured to the cap 61. The cylinder 62 is drilled with a channel enabling the horizontal translation of the rod 63. The other end to the left of the rod 63 is mounted on a capping 66 which receives a right-side end of the determined stiffness spring 67 whose left-side end carries the ball 38 already described in FIG. 3. The ball 38, the spring 67, the rod 63 and its cylinder 62 as well as the cap 61 are aligned on a horizontal axis drilling to the drawing of the block 71 which opens into another perpendicular drilling 69 with an axis 70 opening into the compression chamber 20 of the jack.

The drilling 69 applied on the block 71 carries the needle 37 with an axis 70 along which it can go up and down along the action of the piston of the jack (such as 22, FIG. 3) with the motions of which the needle 37 is coupled.

The upper end (not referenced) of the needle 37 penetrates into the chamber 20 and bears on the bottom of the piston 22 of the jack when the latter is in the retracted position.

The lower end 68 of the needle 37 inside the drilling 69 is in contact with the ball 38. It presents a profile such that, when the needle 37 is displaced downward through the descent of piston (not represented) in the compression chamber 20 (not represented in FIG. 4) above the block 71, the ball 38 is repelled to the right in its horizontal-axis drilling. It transmits then its load to the calibration of the valve.

When the piston leaves the contact with the upper end of the needle 37 as the jack is controlled in extension, the profile 68 of the needle 37 is repelled upward by the ball 38 and the action of the spring 67, so that another calibration is applied to the valve, as has already been explained.

FIGS. 5*a* and 5*b* are sectional schematic representations of two successive states of a second form of a jack-type lifting system according to the present disclosure. The body of the jack 40 is represented with a piston 42 and a jack rod 41.

According to the present disclosure, the bottom of the body of the jack 40 is traversed by a rod 46 which serves as a means for detecting a determined portion of the extension stroke of the jack. The rod 46 which is similar to the needle 37 of the first form is connected to another piston 47 intended to slide inside an auxiliary chamber 43 applied in the bottom of the body of the jack and which forms a distributor of pressures. When the rod 41 of the jack is fully retracted, the piston 42 presents the closest left-side face to the bottom of the chamber 20 of the jack. When the control system of the jack controls an actuation of the jack, a high-pressure inlet 44 on the distributor of pressures constituted by means of the chamber 43 is put into communication with the chambers 43 and 20 via accesses 45 and 48. As a means for modifying the maximum force value of the jack, two air vent valves 51 and 52 present respectively a first and a second calibrations. The first valve 51 is connected on a stroke end point of the piston 47 when the start-up threshold stroke is reached. The second valve 52 is connected on an activation point of a second stroke portion of the piston 42. The first valve 51 presents a maximum pressure value, namely P1Max, such that the maximum value of the force applied by the jack is not high enough for forcing the lock in the event where it has not been unlocked. The second valve 52 presents a maximum pressure value, namely P2Max, such that the maximum value of the force applied by the jack corresponds to the full force of the jack, since it is applied only beyond the threshold stroke of the beginning which corresponds to the possible forcing of the lock in the event where it has not been unlocked.

When the piston 47 reaches its maximum stroke, the rightmost in FIG. 5*b*, the piston 42 exceeded the beginning of the extension stroke of the jack. The connection point of the first valve 51 is obstructed by the piston 43 and the connection point of the second valve 52 is then cleared by the piston 42. The piston 42 then continues its stroke with a value of the force of the jack corresponding to its full force.

In this arrangement, the length of the rod 46 that serves to actuate the piston 42 through the first portion of the stroke of the jack determines the start-up threshold stroke of the lifting.

FIGS. 6*a* to 6*c* are sectional schematic representations of three successive states of a third form of a jack-type lifting system according to the present disclosure.

In FIG. 6*a*, there is schematically represented a jack with two fully retracted rods, the internal rod 57 and the external rod 56. Moreover, the jack is very similar to the jack represented in FIG. 3 and uses substantially the same control system.

However, the valve 38 has been displaced from the bottom of the body of the jack in mechanical contact connection with a needle 37 as has been previously described in FIGS. 3 and 4, toward the other end of the body of the jack, through which the two rods 56 and 57 pass. For this purpose, a valve 61, similar to the valve 28 of FIG. 3 or 4, is mounted on the right-side end of the body of the jack 55. The same valve as the one described in FIG. 4 is used, serving as a means for modifying the value of the maximum force applied by the jack.

In the form of FIGS. 6*a* to 6*c*, instead of using a needle as in the form of FIG. 3 or 4, an associated protrusion 58-60 is used at a determined point of the outer surface of the external rod 56. The protrusion 58-60 serves as a means for detecting a determined portion of the extension stroke of the jack. It is intended to press on a calibration spring 62 of the valve 61 so as to reduce the full pressure applied by the control system of the jack.

The protrusion 58-60 includes a contact portion 59. The longitudinal extension of the protrusion 59 over the external rod 56 determines the start-up threshold stroke. In one form, the protrusion 58-60 includes a fastening portion 58 at one end of the external rod of the jack. The contact portion 59 secured to the fastening portion 58 passes over the outer surface of the body 55 of the jack.

This results in that, when the external rod 56 is retracted, the contact portion 59 presses on a calibration spring 62 of the valve 61. Thus, by pressing on the calibration spring 62, the lever of the protrusion 59 applies an overload on the spring 62, so that the valve 61 applies a reduced value of the maximum force produced by the jack.

Finally, the contact portion 59 is terminated by a tilted portion 60 which allows leaving or regaining the contact with the calibration spring with a relatively continuous variation of the load of the calibration spring. Note that in this instance, it is possible to adapt the profile of the protrusion 58-60 so as to make the calibration overload on the calibration spring 62 vary according to a determined law, so that the jack will apply, as a response, a maximum force value which depending on this calibration overload.

The protrusion 58-60 is visible in FIG. 6*b* in which the internal rod 57 has executed its complete extension motion. Since the protrusion 58-60 is fixed by its fastening portion 58 to the end of the external rod 56, remained stationary, the calibration spring 62 is still loaded because the protrusion 58-60 remains stationary. Hence, the lifting force value applied by the jack to the cowl (not represented) is low.

In FIG. 6*c*, the external rod 56 has begun its extension and the protrusion 58-60 has left the contact with the calibration spring 62. As a result, the valve 61 applies, as a response, a higher force value on the jack and the external rod 56 then continues its stroke under the full lifting force value.

Note that, depending on the position of the valve 61 on the jack body, the longitudinal position of the protrusion 58-60, as well as its length, determine the portion of the jack stroke that undergoes a modification of the power of the jack by reducing, more or less, the maximum force value delivered by the jack depending on its stroke. Similarly, by increasing, more or less, the relative height of the protrusion 58-60 in relation to the calibration spring 62 of the valve 61, it is possible to modulate upon construction the reduction ratio of the maximum force value delivered by the jack based on its stroke.

Note that, in the third form, the movable portion of a determined length characteristic of the present disclosure is mainly composed by the protrusion 58-60 disposed on the movable rod of the jack, the protrusion presenting a profile such that, during the stroke of the movable rod, the profile activates the power reduction means. In one form, the power reduction means may consist of the valve of the forms of FIGS. 3 and 4.

In FIGS. 7*a* and 7*b*, there are schematically represented two sectional representations of two successive states of a fourth form of a jack-type lifting system according to the present disclosure. The identical portions of FIGS. 7*a* and 7*b* carry the same reference numerals and these reference numerals are used indifferently in the description of the two figures even if they are located on only one of them.

In the fourth form, the jack progressively changes in angle during its extension. The rotation effect of the jack during its extension is illustrated in the FIGS. 1 and 2 described above.

In the form, the jack presents a body 80 fitted with a clevis 82 hinged on a fixed portion to which is also secured a case containing the control system of the jack. The control system is similar to the control circuit the diagram of which is described in FIG. 3. At the other end of the jack body 80, a movable jack rod 83 comes out, carrying a clevis (not represented) secured to a movable portion not represented, constituted by a thrust reverser right-side or left-side cowl (3, 10—FIGS. 1 and 2).

In FIG. 7*a*, the jack is represented in a retracted position, its external 81 and internal 83 rods being retracted. As has been explained in FIGS. 1 and 2, because of the geometry of the cowl handled by the jack, when the rods of the jack are deployed, the longitudinal axis 84 of the jack rotates about a clevis 82 hinged on a fixed point, whereas the cowl is progressively raised. The rotation 91 of the axis 84 simultaneously with the longitudinal elongation 90 along the axis 84 is represented in FIG. 7*b*.

As a means for modifying the maximum force value delivered by the jack, an air vent valve 85 is mounted within a case secured to the jack 80 body. It receives the pressure inlet 88 which is connected, on the one hand, to the non referenced chamber of the jack 80, and on the other hand, to the inlet of the air vent valve 85. Depending on its adjustment, the air vent valve 85 discharges the excess pressure to the calibration through an air venting 89. A calibration spring 87 is compressed according to the already explained principle in FIGS. 3 and 4, while pressing on a fixed surface 86 in relation to the rotation of the jack, in a position corresponding to the closed and locked cowl. The adjustment of the valve allows applying a lower pressure value as long as the rotation 91 of the jack, at the beginning of its motion, does not exceed the start-up threshold stroke corresponding to the locking withdrawal. Beyond said threshold stroke, the calibration spring 87 adjusts the valve 85 wherein is applied a full force value of the jack which allows the lifting of the cowl only if the cowl lock has been properly withdrawn.

Of course, other means can be carried out by those skilled in the art in light of the teachings of the present application in order to carry out the means for determining the start-up threshold stroke and the means for modifying the maximum force value delivered by the jack based on the determination of the start-up threshold stroke. Similarly, the arrangements of the present disclosure can be applied for movable portions of a nacelle other than the thrust reverser cowls or for protecting members other than the thrust reverser closing lock, or still in positions through the stroke of the jack other than the start-up position.

What is claimed is:

1. A maintenance access method for controlling at least a lifting jack of a jack-type lifting system for a cowl of a turbojet engine nacelle, the cowl being constituted by half-cylindrical shaped panels hinged, at their upper edge, on hinges and blocked, at their opposite edge, in a closed position by a lock, the jack-type lifting system comprising the lifting jack, the lifting jack including an internal rod which slides inside an external rod, each rod being fitted with a piston at one end, the internal rod being secured to one of the half-cylindrical shaped panels and the external rod being secured to a turbojet engine, said method comprising:

a first step of reducing a maximum force value of the lifting jack to a reduced maximum force value at a beginning of an extension stroke of at least one of the internal or external rods, wherein the extension stroke extends beyond a determined portion; and a second step of switching from the reduced maximum force value resulting from said first step to a nominal maximum force value of the lifting jack when the extension stroke extends beyond the determined portion, the extension stroke extended beyond the determined portion corresponding to a start-up threshold stroke beyond which the cowl escapes from the lock when the lock is properly unlocked.

2. The method according to claim 1, wherein the jack-type lifting system comprises an air vent valve configured to reduce the maximum force value of the lifting jack to the reduced maximum force value, and further comprising detecting the determined portion of the extension stroke before switching from the first step to the second step, wherein switching from the first step to the second step is activated by the detecting the determined portion of the extension stroke.

3. The method according to claim 2, wherein the lifting jack is a fluid jack and the jack-type lifting system includes a controlling system for controlling a pressure supplied to the fluid jack, wherein the air vent valve is connected to at least one pressure source applied to a compression chamber of the fluid jack, further comprising said air vent valve presenting at least two calibrations, so that, through a first portion at the beginning of the extension stroke of the at least one of the internal or external rods located before the determined portion of the extension stroke, a first calibration is applied to a pressure of a fluid of the fluid jack and through a second portion of the extension stroke located after the determined portion of the extension stroke, a second calibration is applied to the pressure of the fluid of the fluid jack.

4. The method according to claim 3, wherein a needle that is movable under an action of the piston at the one end of the internal rod detects the extension stroke extended beyond the determined portion, further comprising an end of the needle presenting a profile such that, through a stroke of the piston at the one end of the internal rod, the profile progressively repels a calibration adjusting ball in contact with a calibration spring of said air vent valve between at least two adjustment positions of said at least two calibrations.

5. The method according to claim 2, wherein the lifting jack is a fluid jack, and wherein modifying the maximum force value of the fluid jack includes a distributor including a pressure chamber applied on a body of the fluid jack in connection with a pressure chamber of the fluid jack, and the air vent valve is at least two air vent valves comprising a first valve and a second valve presenting different calibrations, the first and second valves being connected at determined points of the pressure chamber of the distributor and of the pressure chamber of the fluid jack, a fluid pressure access being connected to the pressure chamber of the distributor and the pressure chamber of the fluid lack and, further comprising the first valve applying the reduced maximum force value through a first portion at the beginning of the extension stroke of the at least one of the internal or external rods and jack the second valve applying the nominal maximum force value of the fluid jack.

6. The method according to claim 5, wherein another rod is connected to a piston and passes through the body of the fluid jack.

7. The method according to claim 2, wherein the detecting the determined portion of the extension stroke includes a protrusion disposed on at least one of the internal or external rods of the lifting jack, further comprising the protrusion presenting a profile such that, through at least one portion of the extension stroke, the profile activates modifying the maximum force value of the lifting jack.

8. The method according to claim 2, wherein the lifting jack progressively changes in an angle during extension, wherein detecting the determined portion of the extension stroke includes a fixed portion in relation to a body of the lifting jack, and wherein modifying the maximum force value of the lifting jack includes a valve for venting a pressurized fluid supply of the lifting jack and a calibration spring configured to remain in contact with a fixed portion in relation to the body of the lifting jack through a determined portion of an angular stroke of the lifting jack.

9. The method according to claim 4, wherein the calibration spring has a determined stiffness and is connected through the first portion of the extension stroke with another calibration spring having another determined stiffness, further comprising applying the second calibration to said air vent valve through the second portion of the extension stroke with the another calibration spring having the another determined stiffness.

10. The method according to claim 2, wherein a movable needle detects the extension stroke extended beyond the determined portion.

* * * * *